(12) United States Patent
Vacanti et al.

(10) Patent No.: US 8,259,002 B2
(45) Date of Patent: Sep. 4, 2012

(54) RADAR ALTIMETER ANTENNA PERFORMANCE MONITORING VIA REFLECTED POWER MEASUREMENTS

(75) Inventors: David C. Vacanti, Renton, WA (US); Anthony H. Luk, Everett, WA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 12/964,957

(22) Filed: Dec. 10, 2010

(65) Prior Publication Data

US 2012/0146837 A1     Jun. 14, 2012

(51) Int. Cl.
*G01S 13/08* (2006.01)
(52) U.S. Cl. ......... 342/120; 342/165; 342/173; 342/195
(58) Field of Classification Search .................. 342/120, 342/165, 173, 195
See application file for complete search history.

(56) References Cited

U.S. PATENT DOCUMENTS

| | | | |
|---|---|---|---|
| 3,739,379 A | | 6/1973 | Davis |
| 5,689,267 A | * | 11/1997 | Cope et al. ..................... 342/174 |
| 6,111,503 A | * | 8/2000 | Javitt et al. ..................... 340/552 |
| 6,348,889 B1 | * | 2/2002 | Ashihara et al. ................. 342/70 |
| 7,161,527 B2 | | 1/2007 | Vacanti |
| 7,239,266 B2 | | 7/2007 | Vacanti |
| 7,295,151 B2 | | 11/2007 | Vacanti |
| 2003/0156060 A1 | * | 8/2003 | Revankar et al. ............. 342/372 |

FOREIGN PATENT DOCUMENTS

| | | |
|---|---|---|
| EP | 9719364 | 5/1997 |
| EP | 1074853 | 2/2001 |
| EP | 2073393 | 6/2009 |
| WO | 0177706 | 10/2001 |

OTHER PUBLICATIONS

Michael D. Foegelle, "Antenna Pattern Measurement: Theory and Equations", "2002 Annual Reference Guide", 2002, Publisher: CE Compliance Engineering.
HR Smith Group of Companies, "Antenna Test Set Model 12-602-3", 2010, Publisher: HR Smith.
Paul Novacek, "Flight Training: Antennas", "http://flighttraining.aopa.org/students/presolo/special/antenna.html", 1999-2010, Publisher: Aircraft Owners and Pilots Association.
"VSWR for Testing 900MHZ Freq Hopper Antenna & Cable", "Communication & Signal Processing Engineering", 1998-2010, Publisher: Tecumseh Group, Inc.
European Patent Office, "European Search Report", mailed Mar. 21, 2012, Published in: EP.

* cited by examiner

*Primary Examiner* — Timothy A Brainard
(74) *Attorney, Agent, or Firm* — Fogg & Powers LLC

(57) ABSTRACT

Systems and methods for radar altimeter antenna performance monitoring via reflected power measurements are provided. In one embodiment, a single antenna radar altimeter comprises: an antenna; a circulator coupled to the antenna; a transmitter coupled to the circulator; a receiver coupled to the circulator; wherein the circulator provides coupling of the transmitter and the receiver to the antenna while providing isolation between the transmitter and the receiver; a reflected power monitor positioned between the circulator and receiver; and a processor coupled to the reflected power monitor via a first analog-to-digital converter, the processor configured to compute and track reflected power measurement statistics from data generated by the reflected power monitor and provide a performance output indicating when one or more of the reflected power measurement statistics exceed a predetermined deviation threshold.

19 Claims, 2 Drawing Sheets

RADAR ALTIMETER ANTENNA PERFORMANCE MONITORING VIA REFLECTED POWER MEASUREMENTS

BACKGROUND

Radar Altimeters are used by aircraft for determining the aircraft's distance to the ground. The formation of ice or fluids on radar altimeter antennas results in degradations of the radar pattern shape which can cause the radar altimeter to provide hazardous misleading information to the aircraft's flight crew and/or flight computer.

For the reasons stated above and for other reasons stated below which will become apparent to those skilled in the art upon reading and understanding the specification, there is a need in the art for systems and methods that provide a dynamic means to monitor performance of radar altimeter antennas.

SUMMARY

The Embodiments of the present invention provide methods and systems for to monitor performance of radar altimeter antennas and will be understood by reading and studying the following specification.

Systems and methods for radar altimeter antenna performance monitoring via reflected power measurements are provided. In one embodiment, a single antenna radar altimeter comprises: an antenna; a circulator coupled to the antenna; a transmitter coupled to the circulator; a receiver coupled to the circulator; wherein the circulator provides coupling of the transmitter and the receiver to the antenna while providing isolation between the transmitter and the receiver; a reflected power monitor positioned between the circulator and receiver; and a processor coupled to the reflected power monitor via a first analog-to-digital converter, the processor configured to compute and track reflected power measurement statistics from data generated by the reflected power monitor and provide a performance output indicating when one or more of the reflected power measurement statistics exceed a predetermined deviation threshold.

DRAWINGS

Figure 1:
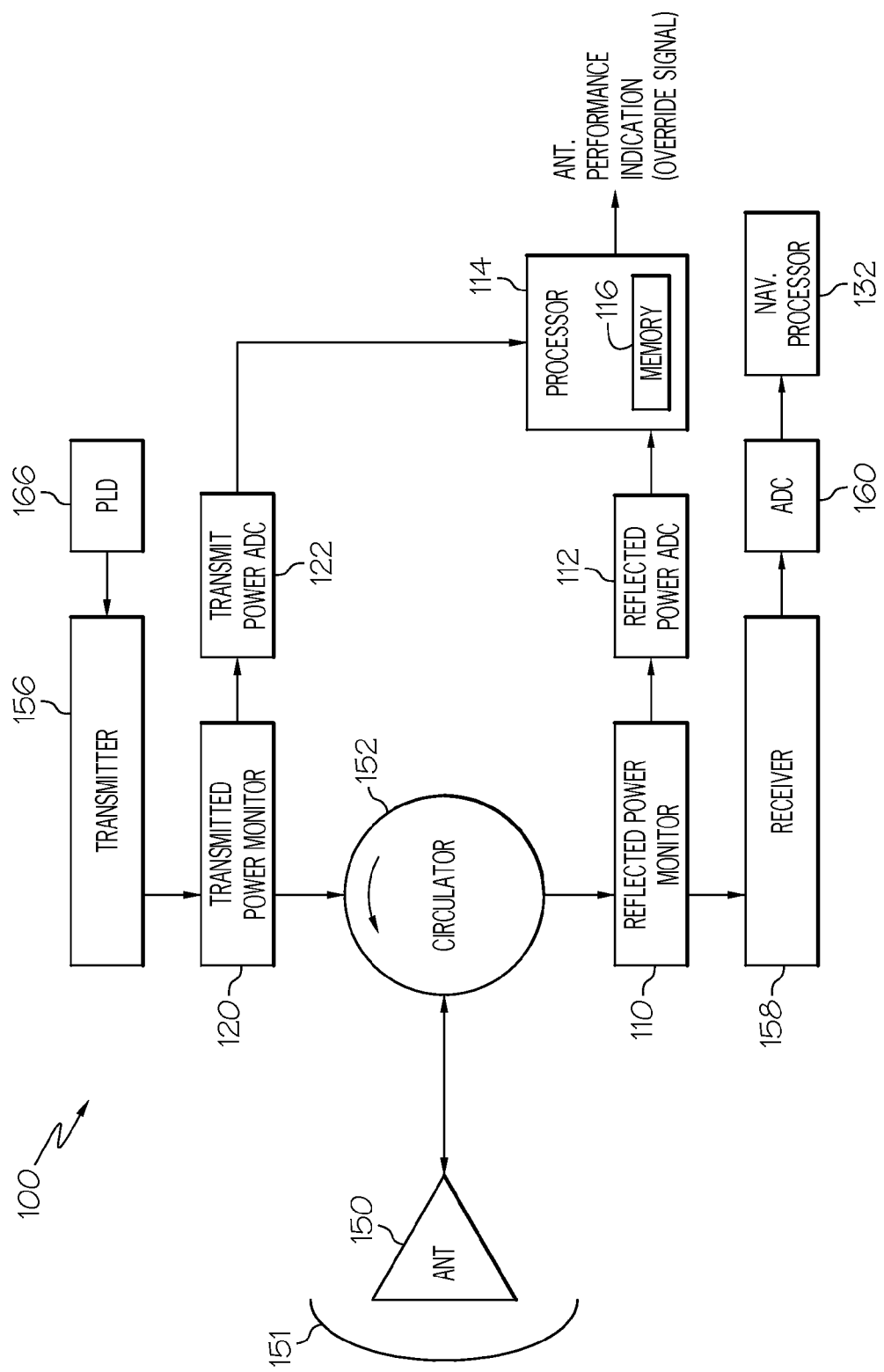
Figure 2:
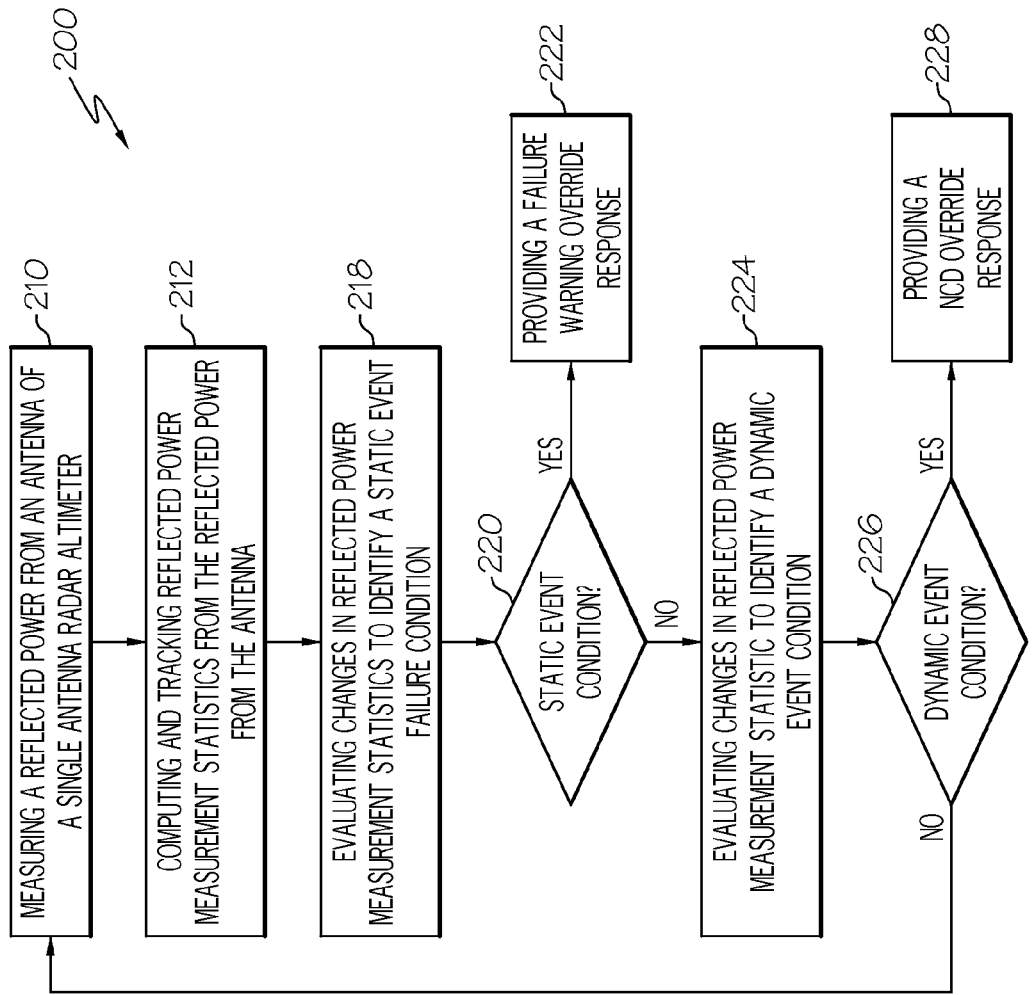

Embodiments of the present invention can be more easily understood and further advantages and uses thereof more readily apparent, when considered in view of the description of the preferred embodiments and the following figures in which:

FIG. 1 is a block diagram illustrating a radar altimeter of one embodiment of the present invention; and FIG. 2 is flow chart illustrating a method of one embodiment of the present invention.

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Embodiments of the present invention utilize characteristics of voltage standing wave ratio (VSWR) estimates to monitor for the occurrence of static and dynamic events to evaluate the operational status of a single antenna radar altimeter (SARA). Dynamic event are characterized as relatively transient in nature and include external events such as sprays of water, rain, snow, sand, and the like falling upon the SARA antenna dome. Static events are characterized by relatively longer term events such as ice accumulation on the SARA antenna, water intrusion of the SARA electronics and other long term antenna degradations.

VSWR is understood in the art as a ratio of two values. Technically VSWR=$(1+\rho)/(1-\rho)$ where $\rho$ is the Reflection Coefficient that is defined as the ratio of the Voltage Transmitted to the Voltage Reflected. In the embodiments present below, an estimate or proxy for a VSWR measurement is obtained by measuring only the voltage reflected from an antenna without computing the entire calculation for VSWR. Detecting antenna degradations can be accomplished by knowing what a nominal reflected power range for a SARA's antenna should be and what reflected power is not acceptable. By monitoring this one portion of the overall measurement embodiments of the present invention can make antenna degradations determinations as discussed below.

FIG. 1 is a simplified block diagram of a single antenna radar altimeter (SARA) 100 of one embodiment of the present invention. SARA 100 comprises a single antenna 150 (typically housed within a radar dome 151), a transmitter 156 and a receiver 158 each coupled to a circulator 152. In this embodiment, circulator 152 provides coupling of transmitter 156 and receiver 158 to antenna 150 while providing isolation between transmitter 156 and receiver 158. In this embodiment, operation of transmitter 156 is driven by a programmable logic device 166. The receiver 158, is coupled to an analog-to-digital converter (ADC) 160 which provides digital samples of the signal received by receiver 158 to an external component 132 (such as a navigation processor, for example) for further signal processing. Specific details regarding the operation of single antenna radar altimeters in general are available to those of ordinary skill in the art, and for that reason are not repeated. See, U.S. Pat. Nos. 7,161,527 and 7,239,266, herein incorporated by reference.

As mentioned above, embodiments of the present invention introduce the concept of utilizing characteristics of reflected power measurements (as a proxy for obtaining actual VSWR values) to identify, characterize and respond to event that affect operation of a SARA. Accordingly, SARA 100 further includes a reflected power monitor 110 coupled between circulator 152 and receiver 158. The output of reflected power monitor 110 is coupled to Reflected Power ADC 112, which in turn in coupled to a processor 114.

Although circulator 152 isolates receiver 158 from directly receiving signals transmitted from transmitter 156, receiver 158 will still receive a certain amount of such transmissions as reflected power from antenna 150. That is, because antenna 150 is not 100% impedance matched with the atmosphere, some small percent of the transmitted signal's power will not be propagated into the atmosphere but will instead be reflected back towards circulator 152. Since circulator 152's function is to pass signals received from antenna 150 to receiver 158, the transmitted signal's reflected power is received by receiver 158. Reflected power monitor 110 observes this reflected power and outputs a reflected power measurement. In the embodiment of FIG. 1, the reflected power measurement is an analog signal which is digitally sampled by Reflected Power ADC 112. The digital samples produced by Reflected Power ADC 112 are processed by processor 114 as discussed in greater detail below. In one embodiment Reflected Power ADC 112 is a 6 bit converter which provides a resolution of 64 possible output values which represent a range from −20 dBm to −2 dBm (a −18 dB dynamic range). In other embodiments, other resolutions can be used.

When antenna 150 is operating normally, the amount of power reflected back toward receiver 158 should be a consistent reflected power level (as measured in dB) less than what was transmitted by transmitter 156. When fluids, sand or ice accumulate on, or impinge on, antenna 150, that changes antenna 150's ability to transmit a signal into space, which affects the proportion of the transmit signal power that is reflected back by antenna 150. With embodiments of the present invention deviations in reflected power level are analyzed to identify faults or degradations that can affect SARA 100's ability to provide reliable altitude measurements.

In one embodiment, in operation, processor 114 collects samples of reflected power dB measurements into a sample group. The sample group comprises a group of reflected power measurement samples that are collected over a sampling period that is equal to the radar modulation period used by transmitter 156. For example, where the radar modulation period is 1 mSec, processor 114 collects samples over that 1 mSec period as a sample group. In one embodiment, Reflected Power ADC 112 is clocked to produce 256 samples of the reflected power measurements for every 1 mSec period (that is, each sample group would include 256 samples of reflected power measurements) which is a sampling rate of 256 KHz. In other embodiments, Reflected Power ADC 112 can operate at other clock speeds. The clock speed for obtaining samples of reflected power can be readily determined by one of ordinary skill in the art upon reading this specification based on the particular design of the SARA to which embodiments of the present invention are being utilized.

Because the both the shape and the power level of a signal transmitted by transmitter 156 over the modulation period is known, and because the reflected power from antenna 150 under non-event conditions is known (that is, the reflected power should vary in a predictable manner as a function of the transmit signal over the modulation period), it possible to collect baseline reflected power dB power statistics for SARA 100, which are stored in memory 116 of processor 114. In one embodiment, the collected baseline reflected power dB power statistics over a sampling period for a baseline sample group include a maximum reflected power in dB, a minimum reflected power in dB, a $\Delta$reflected power$_{max-min}$ in dB and an average reflected power in dB. Subsequently, when SARA 100 is in operation under field conditions, real-time reflected power dB power statistics are computed and tracked and compared to the base line sample group to identify anomalous operating conditions.

For example, in one embodiment in operation, processor 114 computes and tracks maximum reflected power in dB, minimum V reflected power in dB, $\Delta$V reflected power$_{max-min}$ in dB and average reflected power in dB for sample groups over time. For this example, the expected normal $\Delta$reflected power$_{max-min}$ in dB for baseline conditions is 1.5 dB with an average reflected power of −15.5 dB. As long as the real-time reflected power dB power statistics are within predetermined deviation thresholds for these values, antenna 150 is presumed to be dry and the altimeter readings provided by SARA 100 are presumed valid.

Dynamic events such as fluids impacting antenna 150 will not significantly affect the average reflected power measurement, but are detectable from a sudden increase in $\Delta$reflected power$_{max-min}$ as well as changes in $\Delta$reflected power$_{max-min}$ from one measured sample group to the next. When random patterns of fluids impact antenna 150, the fluid will cause and improvement in the impedance matching of the antenna 150 with the atmosphere for one moment (reducing reflected power), and reduce the impedance matching of antenna 150 at another moment (increasing the reflected power). For this reason, the $\Delta$reflected power$_{max-min}$ within a sample group can be expected to increase under such conditions with respect to the baseline, and the $\Delta$reflected power$_{max-min}$ from one sample group to the next will also fluctuate with respect to each other. In one embodiment, when the $\Delta$reflected power$_{max-min}$ exceeds a predetermined threshold (such as 4.5 dB for example), without deviation in average reflected power beyond a threshold value, processor 114 flags the event as a media impact on the antenna event. Alternately, can utilize maximum reflected power instead of, or in addition to average reflected power. For example, in one embodiment, when the $\Delta$reflected power$_{max-min}$ exceeds a predetermined threshold, without an increase in the maximum reflected power beyond a threshold value, processor 114 flags the event as a dynamic media impact event. Processor 114, in one embodiment, reacts to the dynamic media impact event by altering its signal processing to accommodate the dynamic data. If the condition persists over a predetermined time period, processor 114 will output a No Computed Data (NCD) signal. Once the event conditions have passed (i.e., the reflected power statistics return to within threshold values), processor 114 then returns normal processing.

Unlike dynamic events, static event such as water intrusion or ice buildup on antenna 150 (or dome 151) can be expected to significantly affect the average reflected power measurement and maximum reflected power measurements, but not necessarily cause an increase in $\Delta$reflected power$_{max-min}$ with respect to baseline data. For example, as ice builds up on the antenna 150, the reflected power increases as the antenna's ability to propagate power to the atmosphere decreases. Thus both the maximum and average reflected power can be expected to be increased over baseline values for as long as the condition exists. A flooded radar antenna dome will be characterized as a flat reflected power response over the modulation period, as opposed to a $\Delta$reflected power$_{max-min}$ increase over baseline. In addition, because of the reduced ability to transmit power to the atmosphere with water inside the radar antenna dome the maximum and average reflected power measurements will increase over baseline. In one embodiment, when one or both of the maximum and average reflected power exceed a threshold, processor 114 generates a failure warning (FW) override signal.

In an alternate embodiment, the additional monitoring of transmitted power can provide measurements to augment the reflected power information. As illustrated in FIG. 1, in one embodiment, SARA 100 further includes a transmitted power monitor 120 coupled to a transmit power ADC 122 which is coupled to processor 114. In addition to the conditions discussed above, conditions suggesting additional fault modes can be identified when transmit power measurements are available. For example, if the reflected power measurements should collapse, a loss of power at transmitter power monitor 120 can confirm a transmitter 156 failure. A loss of reflected power measurements when power at transmitter power monitor 120 is normal can indicate a circulator 152 failure (i.e., the signal path between antenna 150 and receiver 158 has failed). An increase in power at reflected power monitor 110 when power at transmitter monitor 120 is normal can also indicate a circulator 152 failure (i.e., circulator 152 no longer inhibits leakage current from transmitter 156 to receiver 158).

FIG. 2 is a flow chart illustrating a method of one embodiment of the present invention. The method begins at 210 with measuring a reflected power from an antenna of a single antenna radar altimeter. As discussed above, by obtaining reflected power measurements and monitoring them over time, identifying the occurrence of static and dynamic events can be used to evaluate the operational status of a single antenna radar altimeter (SARA). The method proceeds to 212 with computing and tracking reflected power measurement statistics from the reflected power from the antenna. In one embodiment, the reflected power measurement statistics include a Maximum reflected power, a Minimum reflected power and a $\Delta$reflected power$_{max\text{-}min}$. In one embodiment, as the reflected power raw data measurements and statistics are computed by a processor and stored in memory so that changes in reflected power can be monitored over time.

In one embodiment, "computing and tracking" at block 212 comprises collecting samples of the reflected power measurements (in dB) as a sample group over a sampling period that is equal to the radar modulation period used by SARA. In that case, Maximum reflected power, a Minimum reflected power and a $\Delta$reflected power$_{max\text{-}min}$ statistics each describe those statistics with respect to a particular sample group. For example, where the SARA's radar modulation period is 1 mSec, "computing and tracking" at block 212 comprises collecting samples over that 1 mSec period as a sample group. In one embodiment, an analog to digital converter coupled to a reflected power monitor is clocked to produce 256 samples of the reflected power measurements for every 1 mSec period (that is, each sample group would include 256 samples of reflected power measurements). In other embodiments, other clock speeds can be used as mentioned above.

Because the both the shape and the power level the transmitted signal over the modulation period is known, the pattern of reflected power under normal conditions from the SARA antenna is also known. The reflected power will vary in a predictable manner as a function of the transmit signal over the modulation period establishing baseline reflected power dB power statistics used for identifying anomalous conditions. In one embodiment, collected baseline reflected power dB power statistics include a maximum reflected power, a minimum reflected power, and a $\Delta$reflected power$_{max\text{-}min}$ (which in one embodiment are each measured in dB). In alternate embodiment, other statistics such as an average reflected power can also be computed and tracked.

The method proceeds to 218 with evaluating changes in reflected power measurement statistics to identify a static event failure condition. Where a failure condition is identified (at block 220), the method proceeds to 222 with providing a failure warning override response. Unlike dynamic events, static event such as water intrusion or ice building up on the SARA antenna will significantly increase the Maximum reflected power measurements because reflected power from the antenna will increase as the antenna's ability to propagate power to the atmosphere decreases. Note that such static event will not necessarily cause an increase in $\Delta$reflected power$_{max\text{-}min}$ because both the minimum and average reflected power can also be expected to be increased over baseline values for as long as the condition exists. For example a flooded radar antenna dome housing will be characterized as a flat reflected power response (i.e., having a small $\Delta$reflected power$_{max\text{-}min}$ over the modulation period).

Accordingly for some embodiments, evaluating changes in reflected power measurement statistics is based on increases in either Maximum or average reflected power of a sample group as compared with previous sample groups. Then, when one or both of the maximum and average reflected power exceed a threshold a failure warning (FW) override signal is generated.

The method proceeds to 224 with evaluating changes in a $\Delta$reflected power$_{max\text{-}min}$ measurement statistic to identify a dynamic event condition. Where a failure condition is identified (block 226), the method proceeds to 228 with providing a no computed data (NCD) override. Dynamic events such as fluids impacting a SARA's antenna will not significantly affect the average reflected power measurement, but are detectable from a sudden increase in $\Delta$reflected power$_{max\text{-}min}$ and by observing variations in $\Delta$reflected power$_{max\text{-}min}$ from one measured sample group to the next. As mentioned above, this is because, random patterns of fluids impacting the antenna will alternate between causing improvements and reductions in the impedance matching of the antenna with the atmosphere. The $\Delta$reflected power$_{max\text{-}min}$ within a sample group can be expected to increase under such conditions with respect to the baseline, and the $\Delta$reflected power$_{max\text{-}min}$ from one sample group to the next will also fluctuate with respect to each other. In one embodiment, if the dynamic event condition persists over a predetermined time period, then the No Computed Data (NCD) signal is generated.

For example, in one embodiment a normal $\Delta$reflected power$_{max\text{-}min}$ for a SARA is less than 1.5 dB. A dynamic event such as fluid impact on the antenna dome causes the $\Delta$reflected power$_{max\text{-}min}$ to exceed 4.5 dB. Where fast Fourier transforms are being used to evaluate the reflected power measurements, $\Delta$reflected power$_{max\text{-}min}$ needs to be evaluated over corresponding samples of a sample group when comparing the current $\Delta$reflected power$_{max\text{-}min}$ with historical values. For comparison purposes, a Maximum reflected power measurement persistently greater than 6 dB above a threshold maximum value (which can be based on the SARA's baseline statistics) would be an indication of a static event such as fluids penetrating the antenna dome. These values are for illustrative purposes only. One of ordinary skill in the art upon reading this specification would be able to determine baseline and/or threshold values for implementing embodiments of the present invention based on the particular design parameters of the SARA.

Several means are available to implement the systems and methods of the current invention as discussed in this specification. These means include, but are not limited to, digital computer systems, microprocessors, application-specific integrated circuits (ASIC), general purpose computers, programmable controllers and field programmable gate arrays (FPGAs), all of which may be generically referred to herein as "processors". For example, in one embodiment, signal processing may be incorporated by an FPGA or an ASIC, or alternatively by an embedded or discrete processor. Therefore other embodiments of the present invention are program instructions resident on computer readable media which when implemented by such means enable them to implement embodiments of the present invention. Computer readable media include any form of a physical computer memory device. Examples of such a physical computer memory device include, but is not limited to, punch cards, magnetic disks or tapes, optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device. Program instructions include, but are not limited to computer-executable instructions executed by computer system processors and hardware description languages such as Very High Speed Integrated Circuit (VHSIC) Hardware Description Language (VHDL).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A method for determining radar altimeter antenna performance, the method comprising:
    measuring a reflected power from an antenna of a single antenna radar altimeter;
    computing and tracking reflected power measurement statistics from the reflected power from the antenna;
    evaluating changes in reflected power measurement statistics to identify a static event failure condition;
    providing a Failure Warning (FW) override response when a static event failure condition is identified;
    evaluating changes in a reflected power measurement statistics to identify a dynamic event condition; and
    providing a No Computed Data (NCD) override response when a dynamic event failure condition is identified.

2. The method of claim 1, wherein computing and tracking reflected power measurement statistics comprises computing and tracking at least a maximum reflected power measurement statistic for the antenna, a minimum reflected power measurement statistic for the antenna, and a $\Delta$reflected power$_{max-min}$ measurement statistic for the antenna.

3. The method of claim 1, wherein measuring a reflected power further comprises collecting reflected power measurement samples as sample group collected over a period equal to a modulation period of the single antenna radar altimeter.

4. The method of claim 1, wherein computing and tracking reflected power measurement statistics further comprises collecting a plurality of sample groups, each of the plurality of sample groups collected over a period equal to a modulation period of the single antenna radar altimeter, and wherein the reflected power measurement statistics are computed for each of the plurality of sample groups.

5. The method of claim 4, further comprising evaluating changes in reflected power measurement statistics for a current sample group of the plurality of sample groups against at least one previous sample group of the plurality of sample groups.

6. The method of claim 5, wherein evaluating changes in reflected power measurement statistics includes evaluating changes in at least one of maximum reflected power and average reflected power.

7. The method of claim 4, further comprising evaluating changes in a $\Delta$reflected power$_{max-min}$ measurement statistics for a current sample group of the plurality of sample groups against at least one previous sample group of the plurality of sample groups.

8. The method of claim 1, further comprising measuring a transmitted power to the antenna of the single antenna radar altimeter; and
    evaluating changes in reflected power measurement statistics against changes in transmitted power measurement statistics.

9. The method of claim 1, wherein a static event failure condition is identified based on when at least one of a maximum reflected power statistic or an average reflected power statistic exceed a threshold value.

10. The method of claim 1, wherein a dynamic event condition is identified based on when a $\Delta$reflected power$_{max-min}$ measurement statistic exceeds a threshold value.

11. A single antenna radar altimeter, the altimeter comprising:
    an antenna;
    a circulator coupled to the antenna;
    a transmitter coupled to the circulator;
    a receiver coupled to the circulator; wherein the circulator provides coupling of the transmitter and the receiver to the antenna while providing isolation between the transmitter and the receiver;
    a reflected power monitor positioned between the circulator and receiver;
    a transmitted power monitor positioned between the circulator and transmitter; and
    a processor coupled to the reflected power monitor via a first analog-to-digital converter, the processor configured to compute and track reflected power measurement statistics from data generated by the reflected power monitor and provide a performance output indicating when one or more of the reflected power measurement statistics exceed a predetermined deviation threshold;
    the processor further coupled to the transmitted power monitor via a second analog-to-digital converter, the processor configured to compute and track transmitted power measurement statistics from data generated by the transmitted power monitor and provide a performance output indicating a condition of the antenna based on comparing changes in the reflected power measurement statistics against changes in the transmitted power measurement statistics.

12. The altimeter of claim 11, wherein the processor computes and tracks reflected power measurement statistics that include one or more of a maximum reflected power, a minimum reflected power, a $\Delta$reflected power$_{max-min}$ and an average reflected power.

13. The altimeter of claim 11, wherein the processor collects samples of reflected power measurements as a plurality of sample groups, each sample group comprising samples collected over a sampling period that is equal to a radar modulation period used by the transmitter.

14. The altimeter of claim 13, wherein the processor evaluates changes in reflected power measurement statistics by evaluating changes in reflected power measurement statistics for a current sample group of the plurality of sample groups with at least one previous sample group of the plurality of sample groups.

15. The altimeter of claim 11, wherein the processor is configured to provide a performance output indicating a failure warning (FW) override signal when at least one of a maximum reflected power measurement statistic or an average reflected power measurement statistic exceed a threshold value.

16. The altimeter of claim 11, wherein the processor is configured to provide a performance output indicating a No Computed Data (NCD) override when a $\Delta$reflected power$_{max-min}$ measurement statistic crosses a threshold value.

17. A system for determining radar altimeter antenna performance, the system comprising:
    a processor having access to memory; and
    an analog to digital converter coupled to a radar frequency reflected power monitor, wherein the radar frequency reflected power monitor outputs a reflected power measurement representing power reflected from an antenna for a single antenna radar altimeter;

wherein the processor collects samples of reflected power measurements into a plurality of sample groups, each of the sample groups comprising a plurality of reflected power measurements captured over a period of time corresponding to a radar modulation period for radar transmissions from the single antenna radar altimeter;

wherein the processor computes reflected power measurement statistics for each of the plurality of sample groups, and stored the reflected power measurements statistics into the memory; and wherein the processor tracks the reflected power measurements over time and outputs at least one override signal when the reflected power measurements are determined by the processor to characterize an event indicating a degradation affecting the antenna of the single antenna radar altimeter.

18. The system of claim 17, wherein the processor outputs a first override signal based on changes in one or both of maximum reflected power statistics over time, or average reflected power measurement statistics, over time.

19. The system of claim 18, wherein the processor outputs a second override signal based on changes in $\Delta$reflected power$_{max-min}$ measurement statistics over time.

* * * * *